United States Patent
Lee et al.

(10) Patent No.: US 8,531,641 B2
(45) Date of Patent: Sep. 10, 2013

(54) LIQUID CRYSTAL DISPLAY DEVICE AND METHOD OF MANUFACTURING THE SAME

(75) Inventors: Dae-Won Lee, Yongin (KR); Kyung-Min Park, Yongin (KR)

(73) Assignee: Samsung Display Co., Ltd. (KR)

( * ) Notice: Subject to any disclaimer, the term of this patent is extended or adjusted under 35 U.S.C. 154(b) by 185 days.

(21) Appl. No.: 13/004,561

(22) Filed: Jan. 11, 2011

(65) Prior Publication Data

US 2011/0221989 A1 Sep. 15, 2011

(30) Foreign Application Priority Data

Mar. 9, 2010 (KR) .................. 10-2010-0021019

(51) Int. Cl.
*G02F 1/1343* (2006.01)

(52) U.S. Cl.
USPC .......................................... 349/143; 349/139

(58) Field of Classification Search
None
See application file for complete search history.

(56) References Cited

U.S. PATENT DOCUMENTS

| | | | |
|---|---|---|---|
| 6,414,733 B1 | 7/2002 | Ishikawa et al. | |
| 6,577,368 B1 | 6/2003 | Yuh et al. | |
| 6,970,223 B2 * | 11/2005 | Lee et al. | 349/141 |
| 7,280,176 B2 | 10/2007 | Yuh et al. | |
| 2002/0008821 A1 * | 1/2002 | Lee et al. | 349/139 |
| 2003/0231149 A1 * | 12/2003 | Kawamura et al. | 345/76 |
| 2004/0032554 A1 * | 2/2004 | Yoon et al. | 349/113 |
| 2008/0055529 A1 * | 3/2008 | Shirasaka et al. | 349/143 |
| 2009/0206339 A1 * | 8/2009 | Park et al. | 257/59 |

FOREIGN PATENT DOCUMENTS

| | | | |
|---|---|---|---|
| JP | 3-118519 A | * | 5/1991 |
| JP | 10-90708 A | | 4/1998 |
| JP | 3568862 B2 | | 6/2004 |
| JP | 2005-031437 | | 2/2005 |
| KR | 1020020042922 A | | 6/2002 |
| KR | 10-0516056 B1 | | 9/2005 |
| KR | 1020060082627 A | | 7/2006 |
| KR | 1020070058849 A | | 6/2007 |
| KR | 10-2007-0077704 A | | 7/2007 |

OTHER PUBLICATIONS

Korean Registration Determination Certificate issued by the Korean Intellectual Property Office dated Feb. 29, 2012, 5 pages.
Official Action issued by the Korean Industrial Property Office dated Jun. 17, 2011 in Korean Patent Application No. 10-2010-0021019, 5 pages.

* cited by examiner

*Primary Examiner* — Mike Stahl
(74) *Attorney, Agent, or Firm* — Knobbe Martens Olson & Bear, LLP

(57) ABSTRACT

A Liquid Crystal Display (LCD) device and a method of manufacturing the same are provided. The liquid crystal molecules are inclined and rearranged in a radial shape by patterning upper and lower electrodes across and apart from each other on dummy pixels disposed on a black matrix formed in a non-display area of an LCD device and applying an electric field to a liquid crystal layer via the upper and lower electrodes. Thus, ion impurities in the non-display area can be prevented from dispersing to a display area, thereby improving edge part stains of the LCD device. The LCD device includes a first substrate including first pixel electrodes of the dummy pixels; a second substrate facing the first substrate and including first common electrodes formed across and apart from the first pixel electrodes; and a liquid crystal layer disposed between the first substrate and the second substrate, and having liquid crystal molecules rearranged by an electric field applied via the first pixel electrodes and the first common electrodes.

21 Claims, 10 Drawing Sheets

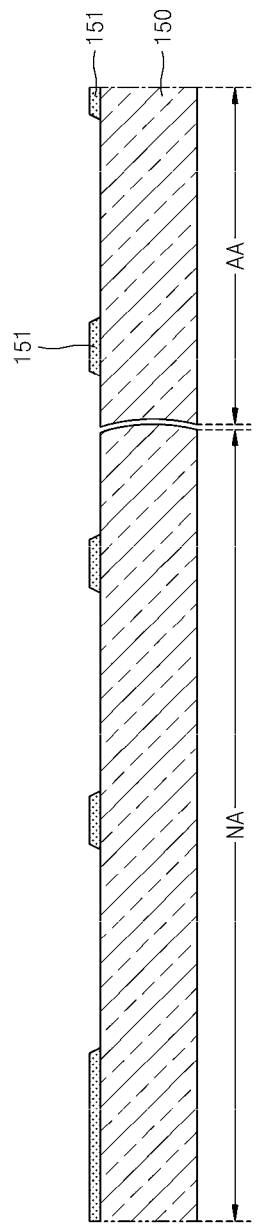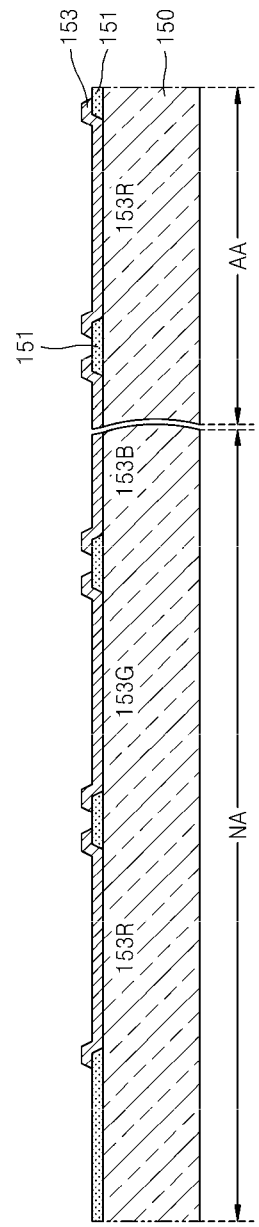

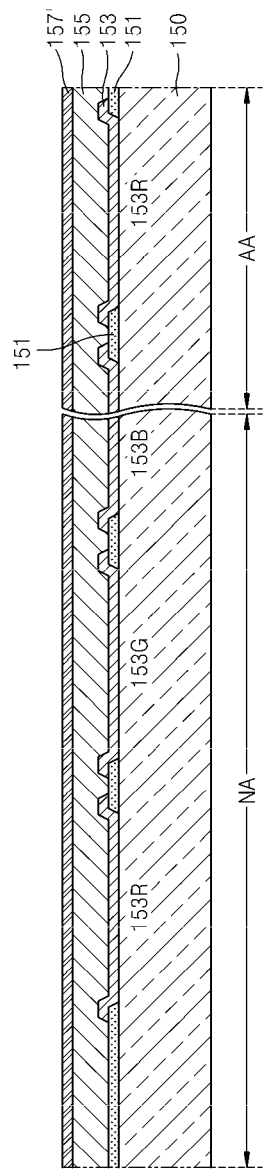
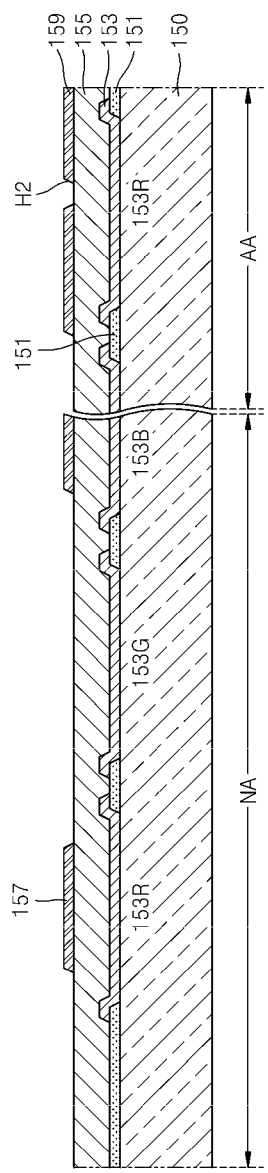
FIG. 7C
FIG. 7D

LIQUID CRYSTAL DISPLAY DEVICE AND METHOD OF MANUFACTURING THE SAME

CROSS-REFERENCE TO RELATED APPLICATION

This application claims the benefit of Korean Patent Application No. 10-2010-0021019, filed Mar. 9, 2010, in the Korean Intellectual Property Office, the disclosure of which is incorporated herein by reference.

BACKGROUND

1. Field

Aspects of the present invention generally relate to a Liquid Crystal Display (LCD) device, and more particularly, to an LCD device of which stains of an edge part is improved.

2. Description of the Related Art

Liquid Crystal Display (LCD) devices are used as display devices of laptop computers and portable televisions due to the LCD devices having features of light weight, thinness, and low power consumption. The LCD devices display an image by inserting a liquid crystal substance between an upper substrate on which a common electrode and color filters are formed and a lower substrate on which thin film transistors (TFTS) and pixel electrodes are formed. The LCD devices change an arrangement of liquid crystal molecules with an electric field formed by applying different potentials to the pixel electrode and the common electrode, and adjusting a transmittance of light by using the arrangement change.

Such an LCD device can be classified into a horizontal electric field type LCD device and a vertical electric field type LCD device according to its driving scheme. The horizontal electric field type LCD device adjusts whether light is transmitted by controlling a motion of liquid crystal molecules in a horizontal direction. The vertical electric field type LCD device adjusts whether light is transmitted by controlling a motion of liquid crystal molecules in a vertical direction. From among the LCD devices, Vertical Alignment (VA) mode LCD devices, in which liquid crystal molecules are arranged so that a long axis of each of the liquid crystal molecules is perpendicular to upper and lower display panels, have been widely used due to a high contrast ratio and ease of realization of a wide reference view angle.

Various methods have been proposed to embody a wide view angle in such a VA mode LCD device, one of which is a Patterned VA (PVA) method arranging liquid crystal molecules to be perpendicular to upper and lower substrates and forming an opening pattern in a pixel electrode and a common electrode. In the PVA method, the liquid crystal molecules are divided and aligned by a fringe field, which is an oblique electric field appearing on the opening patterns, when a voltage is applied to the pixel electrode and the common electrode. In this case, the liquid crystal molecules are inclined and rearranged in a radial shape centering from the surroundings of the opening patterns to the outside, thereby transmitting light to display an image.

A mobile PVA (mPVA) mode, which is a kind of PVA method, divides each unit pixel into a plurality of domains and forms a pixel electrode consisting of sub-electrodes corresponding to respective domains. Since a single pixel can be divided into a plurality of domains and an inclined direction of liquid crystal molecules can be determined by adjusting a direction of an electric field, a reference viewing angle can be widened by dispersing the inclined direction of liquid crystal molecules in various directions. When driving an mPVA mode LCD device, there is a problem wherein stains occur on an edge part of the LCD while ion impurities of a sealant forming a seal line of an outside area move to a display area.

SUMMARY

Aspects of the present invention provide a Liquid Crystal Display (LCD) device for improving edge part stains occurring due to ion impurities of a sealant and a method of manufacturing the same.

According to aspects of the present invention, there is provided a Liquid Crystal Display (LCD) device having dummy pixels in a non-display area comprising: a first substrate including first pixel electrodes of the plurality of dummy pixels; a second substrate facing the first substrate and including first common electrodes formed across and apart from the first pixel electrodes; and a liquid crystal layer, disposed between the first substrate and the second substrate, and having liquid crystal molecules rearranged by an electric field applied via the first pixel electrodes and the first common electrodes.

According to another aspect of the present invention, the first pixel electrodes may be formed on non-adjacent ones of the dummy pixels.

According to another aspect of the present invention, the LCD device may further comprise pixels in a display area, wherein the first substrate comprises switching elements and second pixel electrodes respectively electrically connected to the switching elements of every pixel, and the second substrate comprises second common electrodes facing the second pixel electrodes.

According to another aspect of the present invention, the first pixel electrodes and the second pixel electrodes may comprise the same electrode material or different electrode materials.

According to another aspect of the present invention, the first common electrode and the second common electrode may comprise the same electrode material or different electrode materials.

According to aspects of the present invention, there is provided a Liquid Crystal Display (LCD) device comprising: dummy pixels formed in a non-display area, each dummy pixel comprising one of a first pixel electrode and a first common electrode; pixels formed in a display area, each pixel comprising a second pixel electrode and a second common electrode, wherein the first common electrode is formed across and apart from a first pixel electrode, and wherein the second common electrode faces the second pixel electrode.

According to another aspect of the present invention, the first pixel electrode and the second pixel electrode may comprise the same electrode material or different electrode materials.

According to another aspect of the present invention, the first common electrode and the second common electrode may comprise the same electrode material or different electrode materials.

According to aspects of the present invention, there is provided a method of manufacturing a Liquid Crystal Display (LCD) device, the method comprising: forming a first substrate having first pixel electrodes of dummy pixels disposed in a non-display area and second pixel electrodes of pixels disposed in a display area; forming a second substrate having first common electrodes formed across and apart from the first pixel electrodes and second common electrodes facing the second pixel electrodes; and disposing liquid crystal molecules between the first substrate and the second substrate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7A to 7D are cross-sectional views through line II-II' of FIG. 2A to illustrate a process of manufacturing a facing substrate, according to an embodiment of the present invention.

DETAILED DESCRIPTION OF THE EMBODIMENTS

Figure 1:
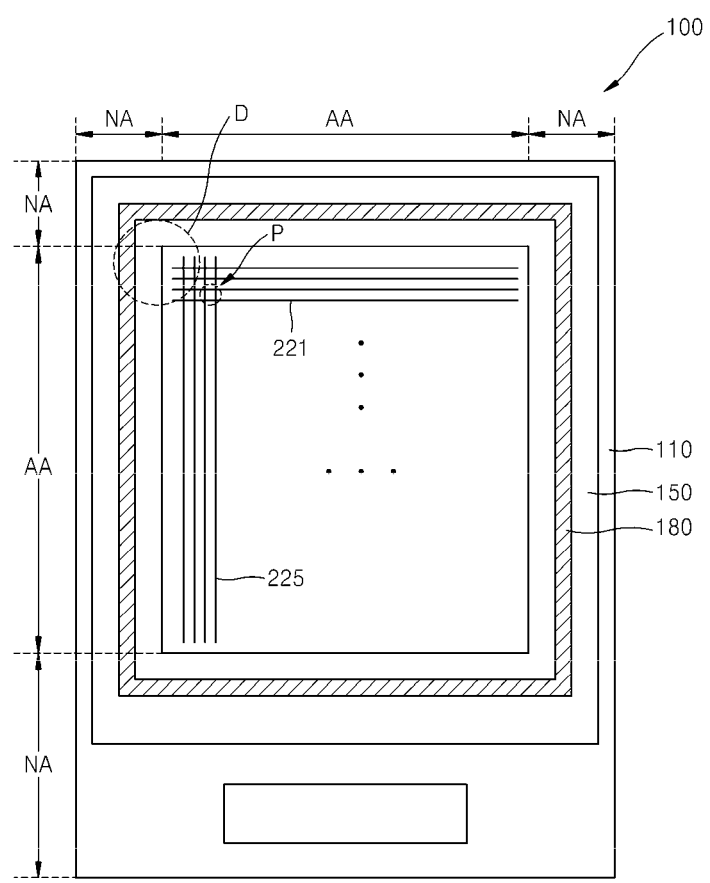
FIG. 1 is a schematic top view of a Liquid Crystal Display (LCD) device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is to be understood that where is stated herein that one element, film or layer is "formed on" or "disposed on" a second element, layer or film, the first element, layer or film may be formed or disposed directly on the second element, layer or film or there may be intervening element, layers or films between the first element, layer or film and the second element, layer or film. Further, as used herein, the term "formed on" is used with the same meaning as "located on" or "disposed on" and is not meant to be limiting regarding any particular fabrication process.

FIG. 1 is a schematic top view of a Liquid Crystal Display (LCD) device 100 according to an embodiment of the present invention. Referring to FIG. 1, the LCD device 100 has a structure in which a display substrate 110 and a facing substrate 150, each divided into a display area AA displaying an image and a non-display area NA surrounding the display area AA, are closely combined, when liquid crystal being inserted between the display substrate 110 and the facing substrate 150. A liquid crystal panel includes the facing substrate 150, the display substrate 110, and a liquid crystal layer.

The display substrate 110 includes thin film transistors TFTs that are switching elements and a pixel electrode that is electrically connected to the TFTs. The facing substrate 150 includes a black matrix (not shown) shielding light incident from a backlight unit, a color filter layer including a color filter pattern in which red R, green G, and blue B are sequentially repeated, and a common electrode under the color filter layer, in this stated order.

In the display area AA, pixels P are defined on cross points of gate lines 221 to which a scan signal is applied and data lines 225 to which a data signal is applied, the plurality of data lines 225 perpendicularly crossing the plurality of gate lines 221. Each of the pixels P includes one of the TFTs, the second pixel electrode electrically connected to one of the TFTs, and the second common electrode facing the pixel electrode. In a non-display area NA close to the display area AA, dummy pixels DP (not shown) are defined. Each of the dummy pixels DP includes one the TFT, a first pixel electrode that is electrically connected to one of the TFTs, and the first common electrode formed across and apart from the pixel electrode.

In the non-display area NA of the liquid crystal panel, a seal line 180 is formed to fix the display substrate 110 and the facing substrate 150 to each other with a constant distance therebetween, after closely combining them. Along the seal line 180, a common voltage line (not shown) applying a voltage to the common electrodes is formed on the display substrate 110. The common voltage line and the common electrodes are electrified via the seal line 180 formed using a conductive sealant or short points formed on at least one of the four corner areas of the seal line 180.

Figure 2A:
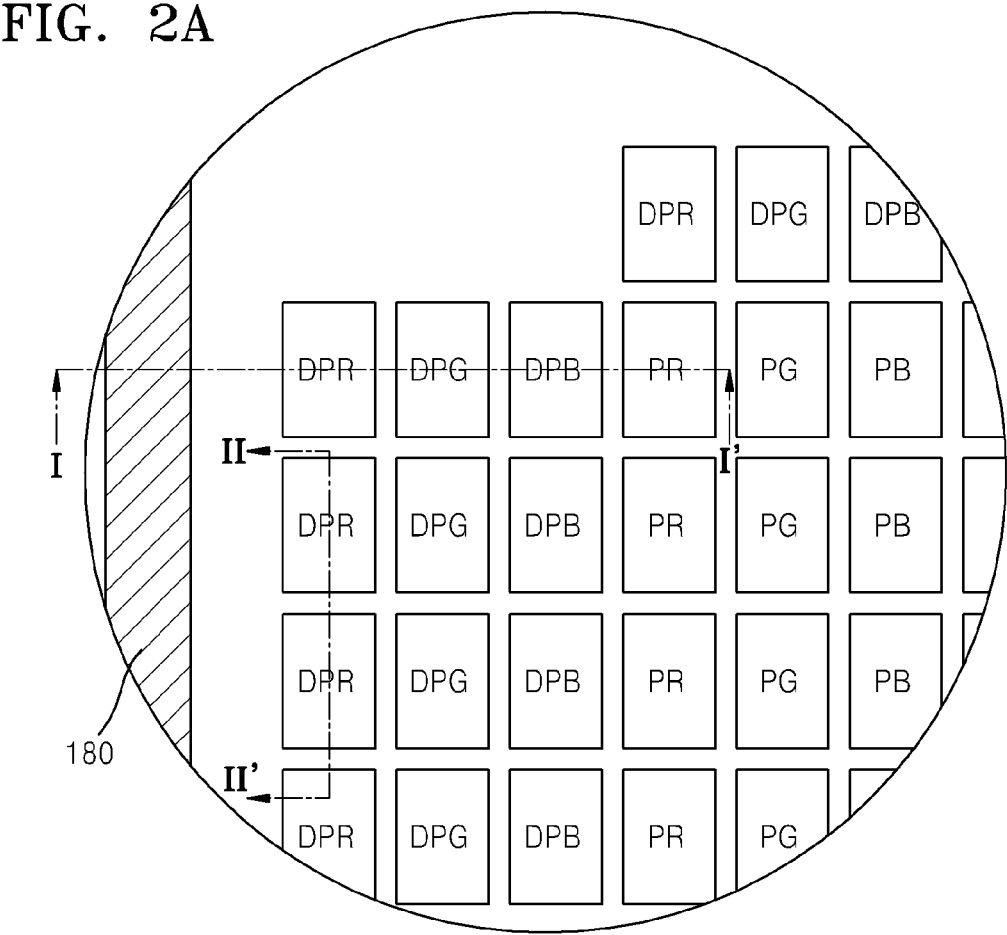
FIG. 2A is a magnified view of an area D of FIG. 1.
Figure 2B:
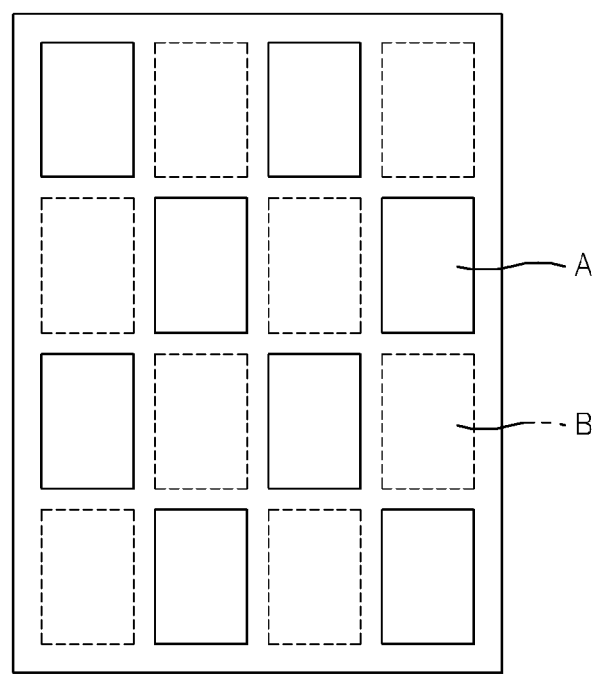
FIG. 2B schematically illustrates an electrode pattern formed on dummy pixels.

FIG. 2A is a magnified view of an area D of FIG. 1, and FIG. 2B schematically illustrates an electrode pattern formed on dummy pixels DP. Referring to FIG. 2A, the liquid crystal panel includes red pixels PR, green pixels PG, and blue pixels PB. The liquid crystal panel also includes red dummy pixels DPR, green dummy pixels DPG, and blue dummy pixels DPB, which are respectively disposed outside the outermost red pixels PR, the outermost green pixels PG, and the outermost blue pixels PB.

The red pixels PR, the green pixels PG, and the blue pixels PB are each repeatedly formed in the display area AA of the liquid crystal panel in a column direction. Also, the red pixels PR, the green pixels PG, and the blue pixels PB are sequentially formed in a row direction. Likewise, the red dummy pixels DPR, the green dummy pixels DPG, and the blue dummy pixels DPB are repeatedly formed in the non-display area NA close to the display area AA of the liquid crystal panel in the column direction. Also, the red dummy pixels DPR, the green dummy pixels DPG, and the blue dummy pixels DPB are sequentially formed in the row direction. Although FIG. 2A illustrates a stripe-type arrangement of pixels and dummy pixels, aspects of the present invention are not limited to this arrangement.

The red dummy pixels DPR, the green dummy pixels DPG, and the blue dummy pixels DPB each include TFTs, first pixel electrodes formed on the display substrate 110, respective red, green, and blue color filters, and first common electrodes formed on the facing substrate 150. On the first pixel electrodes and the first common electrodes, an opening pattern is formed. Each of the red dummy pixels DPR, the green dummy pixels DPG, and the blue dummy pixels DPB includes at most one of the first pixel electrodes and the first common electrodes, wherein the first pixel electrode is not formed one after another and the first common electrode is not formed one after another. For example, as illustrated in FIG. 2B, first pixel electrodes A and first common electrodes B are alternately formed in each row and column, i.e., formed across and apart from each other without overlapping each other.

Accordingly, if a voltage is applied to the first pixel electrode and the first common electrode, a fringe field may be formed between the first pixel electrode and the first common electrode. Each of the red pixels PR, the green pixels PG, and the blue pixels PB includes a TFT, a second pixel electrode formed on the display substrate 110, a red, a green, or a blue color filter, and a second common electrode formed on the facing substrate 150.

The second pixel electrode includes sub-electrodes on which an opening pattern is formed. According to aspects of the present invention, the opening pattern of the second pixel electrode is not limited, and various opening patterns may be used. The second common electrode is formed on the red, green, or blue color filter and has an opening pattern formed according to the opening pattern of the second pixel electrode. Each pixel P is divided into a plurality of domains by the opening patterns of the second pixel electrode and the second common electrode. Thus, the red pixels PR, the green pixels PG, and the blue pixels PB of the liquid crystal panel display an image by changing the arrangement of molecules of liquid crystal by a difference of potential applied to the second pixel electrode and the second common electrode.

Figure 3A:
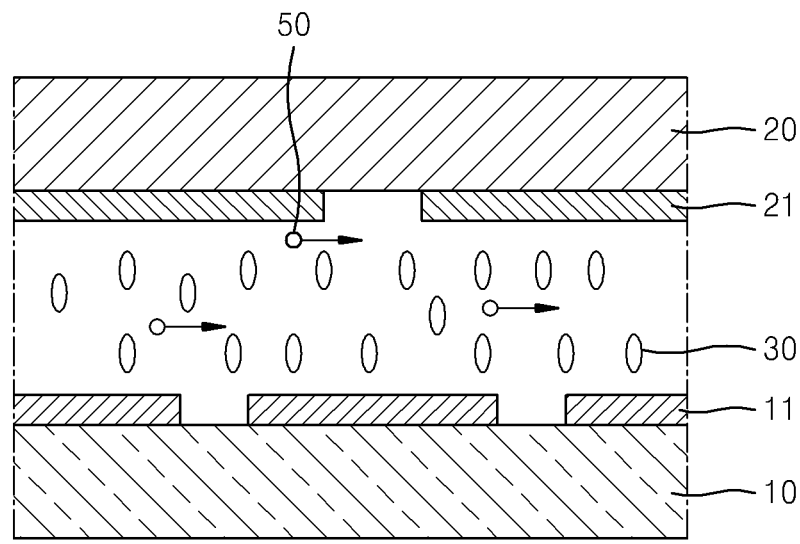
FIGS. 3A and 3B are schematic diagrams illustrating a method of improving stains of an edge part, according to an embodiment of the present invention.
Figure 3B:
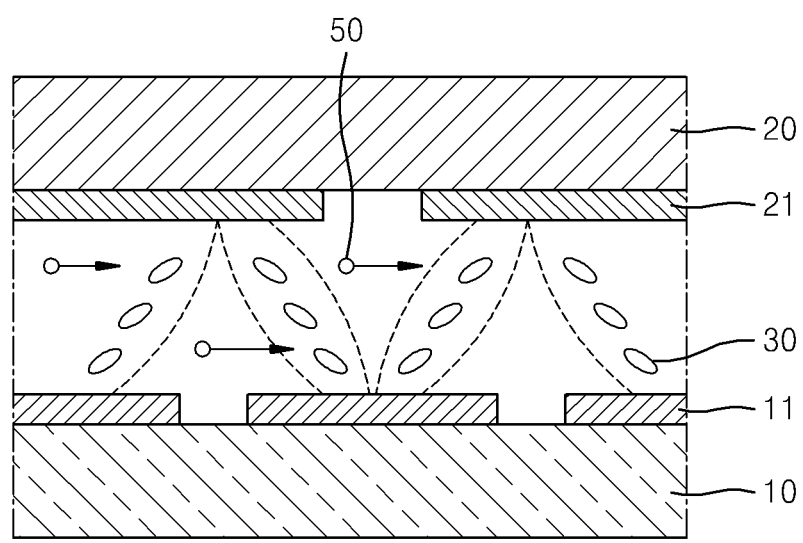

FIGS. 3A and 3B are schematic diagrams illustrating a method of improving stains of an edge part, according to an embodiment of the present invention. FIG. 3A illustrates a case of liquid crystal molecules 30, arranged in a vertical direction, and displaying black when no voltage is applied between a display substrate 10 and a facing substrate 20. FIG. 3B illustrates a case of the liquid crystal molecules 30 inclined and rearranged in a radial shape due to a fringe field occurring in opening patterns of pixel electrodes 11 and common electrodes 21, and displaying white when a voltage is applied between the display substrate 10 and the facing substrate 20.

A moving speed of ion impurities 50 is faster in a case where the liquid crystal molecules 30 are arranged in the vertical direction compared to the case where the liquid crystal molecules 30 are inclined and arranged in the radial shape. This is because the ion impurities 50 receive more van der Waals forces when they pass through the inclined liquid crystal molecules 30.

Edge part stains of an LCD device are generated by the ion impurities 50 of a sealant that is a seal line existing in an outer area being dispersed into the display area AA. Therefore, aspects of the present invention arranges the liquid crystal molecules in the radial shape, as illustrated in FIG. 3(b), by having upper and lower electrodes, such as pixel electrode 11 and common electrode 21, across and apart from each other in dummy pixels formed on an outer black matrix area BM (not shown) of the non-display area NA and forming a fringe field between the upper and lower electrodes in a similar way to the display area AA. Accordingly, the ion impurities 50 are prevented from moving to the display area AA, thereby reducing stains at an edge part of an LCD device.

Figure 4:
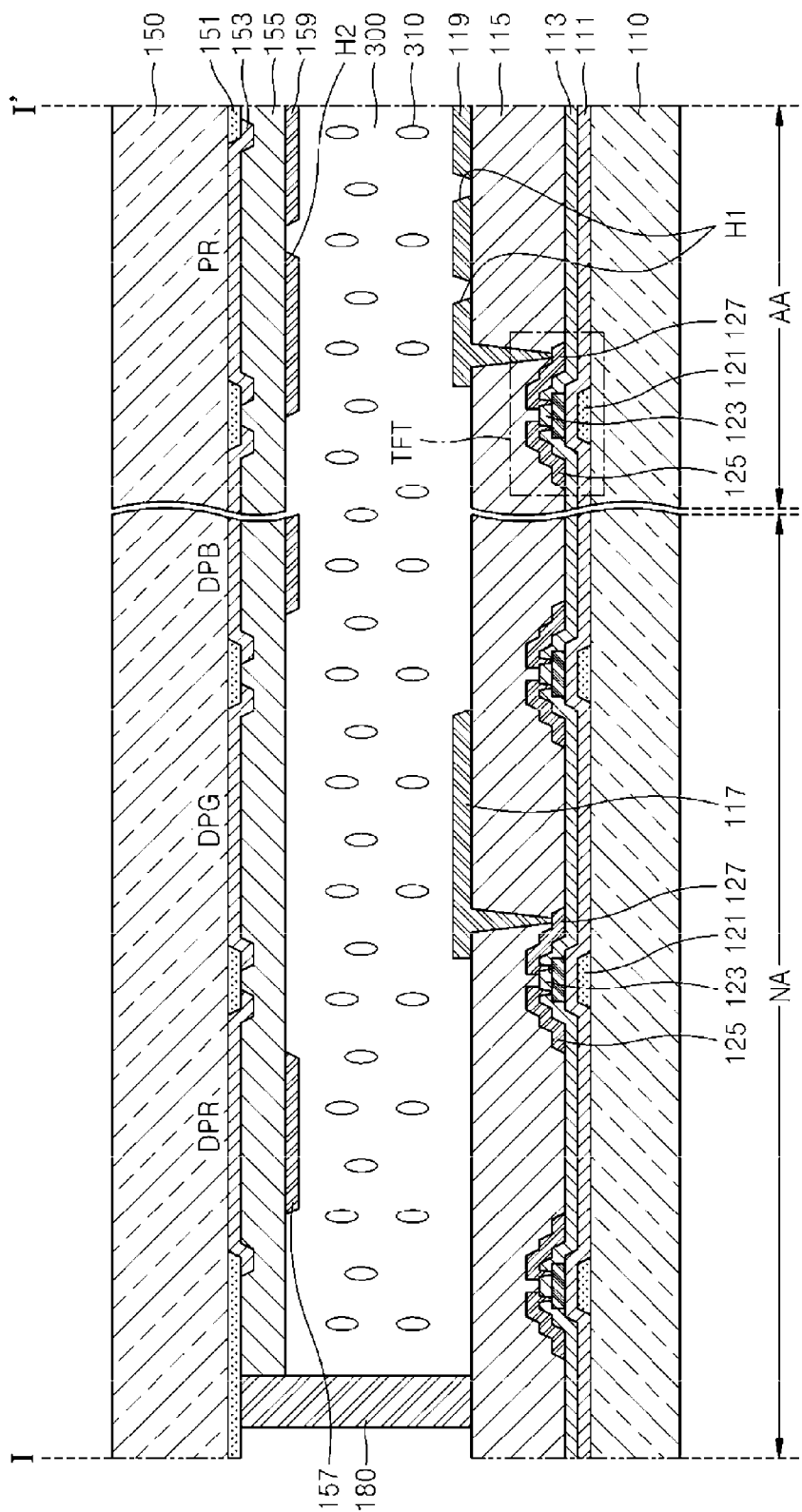
FIG. 4 is a magnified cross-sectional view through line I-I' of FIG. 2A.

FIG. 4 is a magnified cross-sectional view through line I-I' of FIG. 2A. Referring to FIG. 4, the LCD device 100 includes the display substrate 110, the facing substrate 150 facing the display substrate 110, and a liquid crystal layer 300 including liquid crystal molecules 310 between the display substrate 110 and the facing substrate 150. The liquid crystal molecules 310 are aligned in a perpendicular direction with respect to a surface of the display substrate 110 and the facing substrate 150. In the current embodiment, a red pixel PR, a red dummy pixel DPR, a green dummy pixel DPG, and a blue dummy pixel DPB are illustrated.

The display substrate 110 in the display area AA includes a TFT, which is a switching element, for every pixel P. The TFT is electrically connected to a second pixel electrode 119. In the present embodiment, the TFT of the red pixel PR is electrically connected to the second pixel electrode 119. The second pixel electrode 119 includes at least one opening H1 defining a plurality of domains in a unit pixel.

The display substrate 110 in the non-display area NA includes a TFT, which is a switching element, for every dummy pixel DP. One of the TFTs is electrically connected to a first pixel electrode 117 for every two dummy pixels DP in row and column directions. In the present embodiment, only a TFT of the green dummy pixel DPG disposed between the red dummy pixel DPR and the blue dummy pixel DPB is electrically connected to the first pixel electrode 117. However, aspects of the present invention are not limited thereto, and others of the TFTs may be electrically connected to the first pixel electrode 117. Although a TFT is disposed corresponding to every dummy pixel DP in the present embodiment, aspects of the present invention are not limited there to, and a TFT may be formed only corresponding to a dummy pixel DP on which the first pixel electrode 117 is formed.

The first pixel electrode 117 is formed on the same layer as the second pixel electrode 119 and with a same electrode material or different electrode materials as the second pixel electrode 119. An opening pattern may be also formed in the first pixel electrode 117, in a manner similar as formed in the second pixel electrode 119. The second pixel electrode 119 is formed with a transparent conductive material, e.g., crystalline or non-crystalline Indium Tin Oxide (ITO) or Indium Zinc Oxide (IZO). Likewise, the first pixel electrode 117 may be formed with a transparent conductive material, e.g., crystalline or non-crystalline ITO or IZO. However, the first pixel electrode 117 may be formed with an opaque conductive metallic material, e.g., Mg, Al, Ni, Cr, Mo, W, MoW, Au or a combination of at least one of them, or other suitable materials.

The facing substrate 150 includes color filters 153; which includes a red (R) color filter corresponding to the red pixel PR, a red (R) color filter corresponding to the red dummy pixel DPR, a green (G) color filter corresponding to the green dummy pixel DPG, and a blue (B) color filter corresponding to the blue dummy pixel DPB. Black matrices 151 are disposed between the color filters 153. The color filters 153 and the black matrices 151 are covered by an overcoating layer 155. A first common electrode 157 and a second common electrode 159 are disposed on the overcoating layer 155. The black matrices 151 are formed between the color filters 153 and in the non-display area NA, partition liquid crystal cells, shield light and block direct light irradiating onto TFTs so as to prevent a light leakage current of each TFT.

The second common electrode 159 is formed on the facing substrate 150 in the display area AA and has an opening H2 formed at a position corresponding to a portion in which the at least one opening H1 of the second pixel electrode 119 is not formed. In the current embodiment, the second common electrode 159 is formed on the red pixel PR to correspond to the second pixel electrode 119.

The first common electrode 157 is formed on the facing substrate 150 in the non-display area NA at a location where the first pixel electrode 117 is not formed on a dummy pixel DP. Accordingly, the first pixel electrode 117 and the first common electrode 157 are disposed across the liquid crystal layer 300 and apart from each other so as to be not disposed directly across from each other across the crystal layer 300. In the present embodiment, the first common electrode 157 is formed on the color filter 153 of the red dummy pixel DPR and the color filter 153 of the blue dummy pixel DPB.

The first common electrode 157 is formed on the same layer as the second common electrode 159 and with the same or different electrode material as the second common electrode 159. An opening pattern H2 is additionally formed in the second common electrode 159. The second common electrode 159 is formed with a transparent conductive material, e.g., crystalline or non-crystalline ITO or IZO. Likewise, the first common electrode 157 is formed with a transparent conductive material, e.g., crystalline or non-crystalline ITO or IZO. However, the first common electrode 157 may be formed with an opaque conductive metallic material, e.g., Mg, Al, Ni, Cr, Mo, W, MoW, Au or a combination of at least one of them, or other suitable materials.

Figure 5:
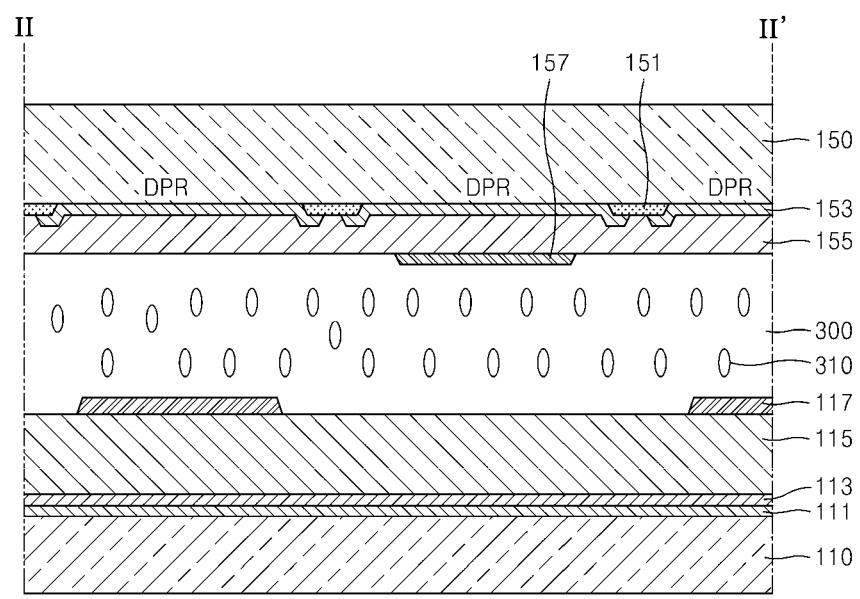
FIG. 5 is a magnified cross-sectional view through line II-II' of FIG. 2A.

FIG. 5 is a magnified cross-sectional view through line II-II' of FIG. 2A. Referring to FIG. 5, the present embodiment illustrates a portion of the red dummy pixels DPR and the dummy pixels DP (not shown) are disposed in the non-display area NA in the row direction.

A first pixel electrode 117 is formed on the display substrate 110 corresponding to every non-adjacent dummy pixel DP, and the first common electrode 157 is formed on the facing substrate 150 across and apart from the first pixel electrode 117. In other words, the first pixel electrode 117 is not formed to be disposed on both of two directly adjacent dummy pixels DP. That is, the first pixel electrode 117 and the first common electrode 157 are disposed across and apart from each other without overlapping each other so that a fringe field is formed when an electric field is applied to the liquid crystal layer 300 via the first pixel electrode 117 and the first common electrode 157.

Figure 6A:
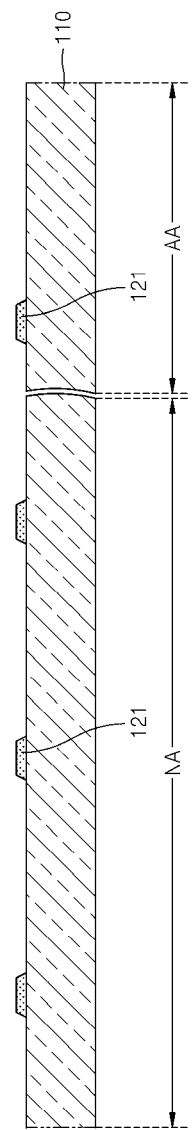
FIGS. 6A to 6D are cross-sectional views through line I-I' of FIG. 2A to illustrate a process of manufacturing a display substrate, according to an embodiment of the present invention.

FIGS. 6A to 6D are cross-sectional views through line I-I' of FIG. 2A and illustrate a process of manufacturing the display substrate 110, according to an embodiment of the present invention. Referring to FIG. 6A, a gate electrode 121 is formed on the display substrate 110 in a predetermined pattern.

The display substrate 110 is formed of a transparent substrate and includes a transparent glass material of which a major component is $SiO_2$. However, aspects of the present invention are not limited thereto and the display substrate 110 may be formed of a transparent plastic material or another suitable material. An insulating layer (not shown) preventing dispersion of impurities, preventing infiltration of moisture or the air, planarizing the surface and acting as a barrier layer and/or a buffer layer may be added to an upper surface of the display substrate 110. The gate electrode 121 is formed by forming a gate metal layer (not shown) on the display substrate 110 and patterning the gate metal layer by a photolithography process.

Figure 6B:
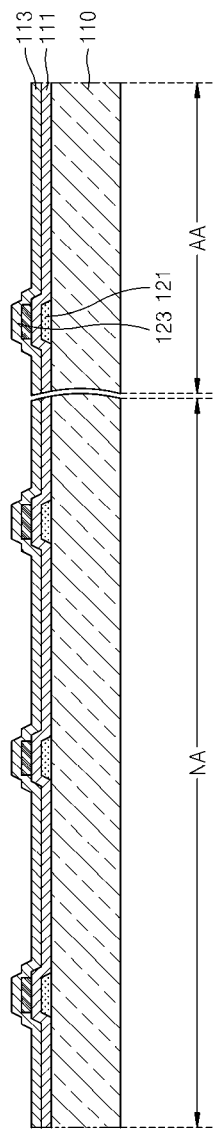

Referring to FIG. 6B, a gate insulation film 111 is formed on the display substrate 110 having the gate electrode 121. The gate insulation film 111 is formed by depositing an inorganic insulation film, e.g., Silicon Oxide or Silicon Nitride, by using a Plasma Enhanced Chemical Vapor Deposition (PECVD) method, an Atmospheric Pressure Chemical Vapor Deposition (APCVD) method, or a Low Pressure Chemical Vapor Deposition (LPCVD) method. However, aspects of the present invention are not limited thereto and the gate insulation film 111 may be formed of other suitable materials and may be formed using other suitable deposition methods.

An active layer 123 is formed on the gate insulation film 111 formed on the display substrate 110 so that the active layer 123 overlaps the gate electrode 121. The active layer 123 is formed in a structure in which a semiconductor layer and an ohmic contact layer are layered. For example, the semiconductor layer includes amorphous silicon, and the ohmic contact layer includes amorphous silicon in which n-type or p-type impurities are doped in high density. An inter-layer insulation film 113 is formed on the display substrate 110 having the active layer 123. However, aspects of the present invention are not limited thereto, and the inter-layer insulation film 113 may be omitted.

Figure 6C:
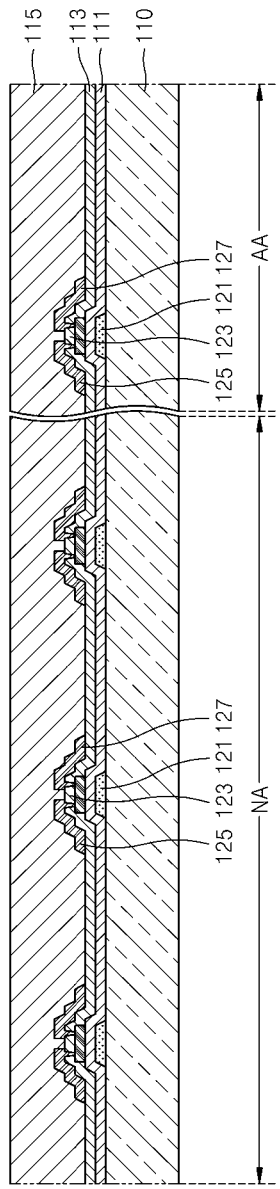

Referring to FIG. 6C, a source electrode 125 and a drain electrode 127, respectively contacting both side portions of the active layer 123, are formed on the display substrate 110 having the inter-layer insulation film 113. To this end, holes are formed in the inter-layer insulation film 113 by etching a portion of the inter-layer insulation film 113 contacting side portions of the active layer 123. The source and drain electrodes 125 and 127 are formed on the inter-layer insulation film 113 to fill the holes. However, aspects of the present invention are not limited thereto, and when the inter-layer insulation film 113 is omitted, the source and drain electrodes 125 and 127 may be formed to directly contact the both side portions of the active layer 123.

A planarization film 115 is formed on the display substrate 110 having the source and drain electrodes 125 and 127. The planarization film 115 is formed with an inorganic substance, e.g., Silicon Oxide or Silicon Nitride, and an organic substance having a good planarization characteristic and photosensitivity. However, aspects of the planarization layer are not limited thereto, and the planarization film 115 may be formed of other suitable materials. The planarization film 115 may be formed in a structure in which an inorganic film and an organic film are layered.

Figure 6D:
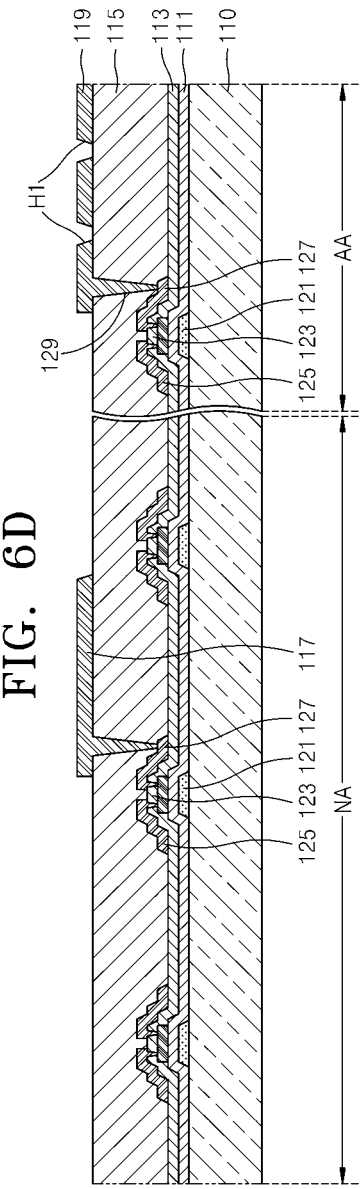

Referring to FIG. 6D, a hole 129 exposing one of the source and drain electrodes 125 and 127 is formed in the planarization film 115 by patterning the planarization film 115. The hole 129 exposes one of the source and drain electrodes 125 and 127 of a TFT disposed corresponding to each pixel in the display area AA. The hole 129 also exposes one of the source and drain electrodes 125 and 127 of a TFT disposed corresponding to each of the dummy pixels DP not having the first common electrode 157.

A transparent electrode layer (not shown) is formed on the display substrate 110 having the hole 129, and the first pixel electrode 117 and the second pixel electrode 119 are formed by patterning the transparent electrode layer. Examples of a material forming the transparent electrode layer are ITO and IZO. However, aspects of the present invention are not limited thereto, and the transparent electrode may be formed of other suitable materials.

The first pixel electrode 117 is formed with a transparent electrode material different from that of the second pixel electrode 119 or with an opaque electrode material. In this case, the transparent electrode layer (not shown) is formed on the display substrate 110 in the display area AA, and a transparent electrode layer made of another electrode material or an electrode layer made of an opaque electrode material is formed on the display substrate 110 in the non-display area NA. The opaque electrode material is a conductive metallic material, such as Mg, Al, Ni, Cr, Mo, W, MoW, Au, or other suitable materials or a combination of at least one of them.

At least one opening H1 is formed in the second pixel electrode 119, and the second pixel electrode 119 is divided into a plurality of domains by the at least one opening H1. Although not shown, at least one opening may also be formed in the first pixel electrode 117. In the present embodiment, a bottom gate type TFT is illustrated as an example of the TFT. However, aspects of the present invention are not limited thereto and another type of TFT, e.g., a top gate type TFT, may be used instead. Although not shown, an alignment film aligning liquid crystal molecules may be additionally formed on the display substrate 110 on which the first pixel electrode 117 and the second pixel electrode 119 are formed.

FIGS. 7A to 7D are cross-sectional views through II-II' of FIG. 2A and illustrate a process of manufacturing the facing substrate 150, according to an embodiment of the present invention. Referring to FIG. 7A, the black matrix 151 is formed on the facing substrate 150 in a predetermined pattern.

The facing substrate 150 is formed with a transparent substrate and includes a transparent glass material of which a major component is $SiO_2$, or a transparent plastic material. The black matrix 151 is formed by injecting organic ink or patterning a metal layer by a photolithography process. The black matrix 151 is formed with Cr, CrOx, or an organic black matrix. However, aspects of the present invention are not limited thereto, and the facing substrate 150 and the black matrix 151 may be formed of other suitable materials.

Referring to FIG. 7B, the color filters 153 are formed on the facing substrate 150 having the black matrix 151 is formed. The color filters 153 include red, green, and blue color filters 153R, 153G, and 153B selectively transmitting only light having a predetermined wavelength. The red, green, and blue color filters 153R, 153G, and 153B are formed in a stripe or mosaic type according to an arrangement method. The color filters 153 are formed by patterning a color photoresist layer by a photolithography process or injecting color ink. However, aspects of the present invention are not limited thereto and the color filters 153 may be formed to be other types of arrangements and by other processes.

Referring to FIG. 7C, the overcoating layer 155 is formed on the facing substrate 150 having the black matrix 151 and the red, green, and blue color filters 153R, 153G, and 153B. The overcoating layer 155 planarizes the facing substrate 150 and is formed of a transparent material. An example of the material forming the overcoating layer 155 is an acrylic resin. A transparent electrode layer 157' is formed on the facing substrate 150 having the overcoating layer 155. Examples of a material used to form the transparent electrode layer 157' are ITO and IZO. The transparent electrode layer 157' is patterned into the first common electrode 157 and the second common electrode 159.

The first common electrode 157 is formed with a transparent electrode material that is different from that of the second common electrode 159 or with an opaque electrode material. In this case, the transparent electrode layer 157' is formed on the facing substrate 150 in the display area AA, and a transparent electrode layer made of another electrode material or an electrode layer made of an opaque electrode material is formed on the facing substrate 150 in the non-display area NA. The opaque electrode material is a conductive metallic material, e.g., Mg, Al, Ni, Cr, Mo, W, MoW, Au, or other suitable materials or a combination of at least two of them.

Referring to FIG. 7D, the first common electrode 157 is disposed across and apart from the first pixel electrode 117 and the second common electrode 159 faces the second pixel electrode 119. The first common electrode 157 and the second common electrode 159 are formed by patterning the transparent electrode layer 157'. If electrode layers forming the first common electrode 157 and the second common electrode 159 are made of different electrode materials, then the electrode layers are respectively patterned into the first common electrode 157 and the second common electrode 159.

At least one opening H2 is formed in the second common electrode 159 so that the at least one opening H2 is across from and not disposed directly on top of the at least one opening H1 of the second pixel electrode 119. The second common electrode 159 is divided into a plurality of domains by the at least one opening H2. In another example, at least one opening (not shown) may be formed in the first common electrode 157. Although not shown, an alignment film aligning liquid crystal molecules may be additionally formed on the facing substrate 150 on which the first common electrode 157 and the second common electrode 159 are formed.

Figure 8:
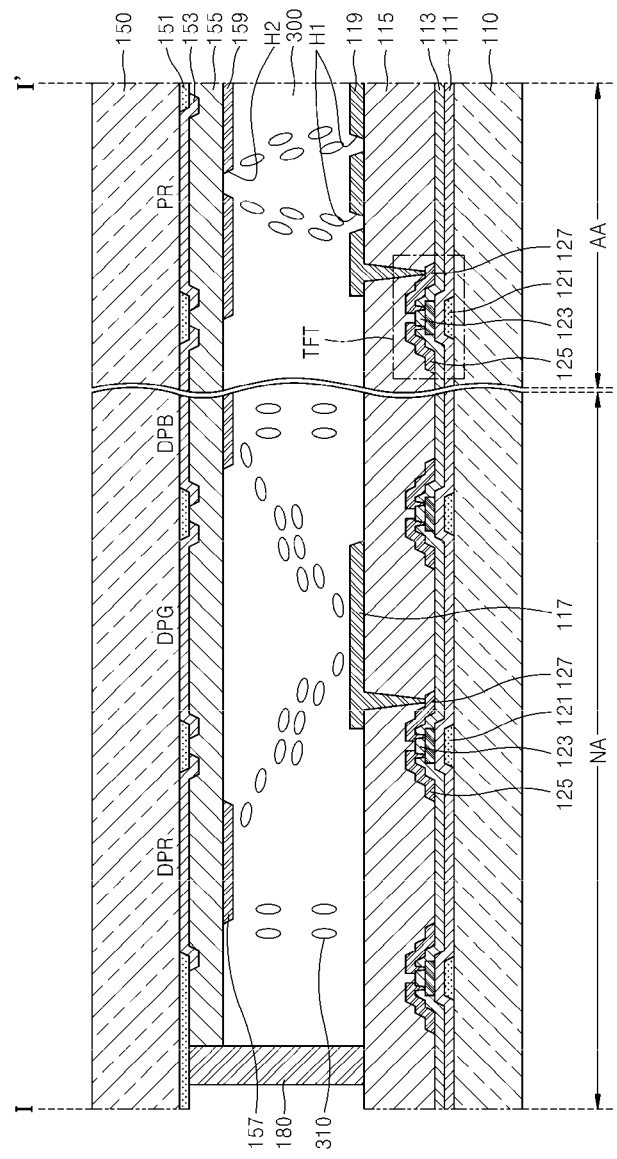
FIG. 8 illustrates liquid crystal arrangement when a voltage is applied to the display substrate and the facing substrate of the LCD device, according to an embodiment of the present invention.

FIG. 8 illustrates liquid crystal arrangement when a voltage is applied to the display substrate 110 and the facing substrate 150 of the LCD device 100, according to an embodiment of the present invention. Referring to FIG. 8, a basic structure of the LCD device 100, manufactured according to an embodiment of the present invention, is made by arranging and combining the display substrate 110 manufactured in the process of FIGS. 6A to 6D and the facing substrate 150 manufactured in the process of FIGS. 7A to 7D. Additionally, the liquid crystal layer 300 is disposed between the display substrate 110 and the facing substrate 150 and is perpendicularly aligned.

The LCD device 100 is made by disposing components, such as a polarizing plate (not shown) and a backlight (not shown), on the basic structure of the LCD device 100. In this case, the polarizing plate is disposed onto both sides of the basic structure. The display substrate 110 and the facing substrate 150 are arranged so that the second pixel electrode 119 overlaps the color filter 153 in the display area AA. Accordingly, each pixel P is divided into a plurality of domains by the at least one opening H1 of the second pixel electrode 119 and the at least one opening H2 of the second common electrode 159. Thus, when an electric field is applied to the liquid crystal layer 300, a fringe field is formed between the second pixel electrode 119 and the second common electrode 159. As a result, a wide view angle may be secured by the re-arranging of liquid crystal molecules.

In addition, the display substrate 110 and the facing substrate 150 are arranged so that the first pixel electrode 117 and the first common electrode 157 are disposed across and apart from each other in the non-display area NA. In other words, the first pixel electrode 117 and the first common electrode 157 are formed so as to be across the liquid crystal layer 300 from each other and are formed so as to not be directly facing each other. Accordingly, when an electric field is applied to the liquid crystal layer 300, the first pixel electrode 117 and the first common electrode 157 of dummy pixels DP form a fringe field. As a result, the liquid crystal molecules 310 are rearranged in a radial shape, thereby preventing ion impurities 50 generated in an outer edge part from moving into the display area AA.

The LCD device 100 according to aspects of the present invention is used in devices such as a Portable Multimedia Player (PMP), a Personal Digital Assistant (PDA), a portable Digital Versatile Disk (DVD) player, a cellular phone, a laptop computer, and a digital television. However, aspects of the present invention are not limited thereto and the LCD device 100 may be used in other devices using a display screen.

According to aspects of the present invention, liquid crystal molecules 310 are inclined and rearranged in a radial shape by a fringe field from upper and lower electrodes, such as the first pixel electrode 117 and the first common electrode 157. The upper and lower electrodes are patterned to be across and apart from each other on dummy pixels DP disposed on a black matrix 151 formed in a non-display area NA of an LCD device 100. The fringe field is formed by applying an electric field to a liquid crystal layer via the patterned upper and lower electrodes. Thus, ion impurities 50 in the non-display area NA are largely prevented from dispersing to a display area AA, thereby improving edge part stains of the LCD device 100.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A Liquid Crystal Display (LCD) device having dummy pixels in a non-display area comprising:
    a first substrate including first pixel electrodes formed only on non-adjacent ones of the dummy pixels;
    a second substrate facing the first substrate and including first common electrodes formed across and apart from the first pixel electrodes; and
    a liquid crystal layer disposed between the first substrate and the second substrate, and
    having liquid crystal molecules rearranged by an electric field applied via the first pixel electrodes and the first common electrodes;
    wherein each dummy pixel includes at most one of a pixel electrode and a common electrode, such that the first common electrodes are not directly facing the first pixel electrodes.

2. The LCD device of claim 1, wherein the first pixel electrodes comprises a transparent electrode material.

3. The LCD device of claim 1, wherein the first pixel electrodes comprises an opaque metallic material.

4. The LCD device of claim 1, wherein the first common electrodes comprises a transparent electrode material.

5. The LCD device of claim 1, wherein the first common electrodes comprises an opaque metallic material.

6. The LCD device of claim 1, wherein the first substrate further comprises switching elements that are electrically connected to the first pixel electrodes.

7. The LCD device of claim 1, further comprising pixels in a display area, wherein the first substrate comprises:
    switching elements; and
    second pixel electrodes respectively electrically connected to the switching elements of every pixel, and
    wherein the second substrate comprises second common electrodes facing the second pixel electrodes.

8. The LCD device of claim 7, wherein the second pixel electrodes and the second common electrodes comprise at least one opening and are divided into a plurality of domains by the at least one opening.

9. A Liquid Crystal Display (LCD) device comprising:
    dummy pixels formed in a non-display area, each dummy pixel comprising one of a first pixel electrode formed only on non-adjacent ones of the plurality of dummy pixels and a first common electrode, wherein pixel electrodes are not formed one after another and common electrodes are not formed one after another such that the first common electrode is not directly facing the first pixel electrode; and
    pixels formed in a display area, each pixel comprising:
        a second pixel electrode electrically connected to a switching element;
        and a second common electrode,
        wherein the first common electrode is formed across and apart from a first pixel electrode, and
        wherein the second common electrode faces the second pixel electrode.

10. The LCD device of claim 9, wherein the first pixel electrode and the second pixel electrode are formed of the same electrode material.

11. The LCD device of claim 9, wherein the first pixel electrode and the second pixel electrode are formed of different electrode materials.

12. The LCD device of claim 9, wherein the first common electrode and the second common electrode comprise the same electrode material.

13. The LCD device of claim 9, wherein the first common electrode and the second common electrode comprise different electrode materials.

14. A method of manufacturing a Liquid Crystal Display (LCD) device, the method comprising:
    forming a first substrate having first pixel electrodes only on non-adjacent ones of the plurality of dummy pixels disposed in a non-display area and second pixel electrodes corresponding to each of the pixels disposed in a display area;
    forming a second substrate having first common electrodes formed across and apart from the first pixel electrodes and second common electrodes facing the second pixel electrodes; and
    disposing liquid crystal molecules between the first substrate and the second substrate
    wherein each dummy pixel includes at most one of a pixel electrode and a common electrode, such that the first common electrodes are not directly facing the first pixel electrodes.

15. The method of claim 14, wherein the first pixel electrodes and the second pixel electrodes comprise the same electrode material.

16. The method of claim 14, wherein the first pixel electrodes and the second pixel electrodes comprise different electrode materials.

17. The method of claim 14, wherein the first common electrodes and the second common electrodes are formed of the same electrode material.

18. The method of claim 14, wherein the first common electrodes and the second common electrodes comprise different electrode materials.

19. The LCD device of claim 1, wherein the non-adjacent ones of the dummy-pixels are every other ones of a series of dummy pixels.

20. The LCD device of claim 9, wherein the non-adjacent ones of the dummy-pixels are every other ones of a series of dummy pixels.

21. The method of claim 14, wherein the non-adjacent ones of the dummy-pixels are every other ones of a series of dummy pixels.

* * * * *